United States Patent
Fish et al.

(10) Patent No.: US 9,908,084 B2
(45) Date of Patent: Mar. 6, 2018

(54) PROCESS FOR REMOVING HEAVY METALS FROM PROCESS STREAMS

(71) Applicant: JOHNSON MATTHEY PUBLIC LIMITED COMPANY, London (GB)

(72) Inventors: Andrew Fish, Cleveland (GB); Andrea Lara Foster, County Durham (GB); Matthew David Gwydion Lunn, County Durham (GB); Rachel Mansfield, Billingham (GB)

(73) Assignee: Johnson Matthey Public Limited Company, London, England (GB)

( * ) Notice: Subject to any disclaimer, the term of this patent is extended or adjusted under 35 U.S.C. 154(b) by 0 days.

(21) Appl. No.: 14/414,959

(22) PCT Filed: Jul. 10, 2013

(86) PCT No.: PCT/GB2013/051826
§ 371 (c)(1),
(2) Date: Jan. 15, 2015

(87) PCT Pub. No.: WO2014/016560
PCT Pub. Date: Jan. 30, 2014

(65) Prior Publication Data
US 2015/0182911 A1    Jul. 2, 2015

(30) Foreign Application Priority Data
Jul. 26, 2012   (GB) .................. 1213360.9

(51) Int. Cl.
| | | |
|---|---|---|
| *C10G 25/00* | (2006.01) | |
| *B01D 53/64* | (2006.01) | |
| *C01B 3/56* | (2006.01) | |
| *C10G 45/22* | (2006.01) | |
| *B01J 20/28* | (2006.01) | |
| *B01J 20/30* | (2006.01) | |
| *B01J 20/02* | (2006.01) | |
| *B01D 53/02* | (2006.01) | |

(52) U.S. Cl.
CPC ............ *B01D 53/64* (2013.01); *B01D 53/02* (2013.01); *B01J 20/0237* (2013.01); *B01J 20/0285* (2013.01); *B01J 20/2803* (2013.01); *B01J 20/28011* (2013.01); *B01J 20/3028* (2013.01); *B01J 20/3085* (2013.01); *C01B 3/56* (2013.01); *C10G 25/003* (2013.01); *C10G 45/22* (2013.01); *B01D 2253/104* (2013.01); *B01D 2253/106* (2013.01); *B01D 2253/1128* (2013.01); *B01D 2256/16* (2013.01); *B01D 2256/20* (2013.01); *B01D 2257/602* (2013.01); *C01B 2203/042* (2013.01); *C01B 2203/0465* (2013.01)

(58) Field of Classification Search
CPC .............. B01D 53/02; B01D 2253/106; B01D 2253/1128; B01D 2256/16; B01D 2257/602; B01D 2256/20; B01D 2253/104; B01D 53/64; B01J 20/0237; B01J 20/3085; B01J 20/28011; B01J 20/3028; B01J 20/2803; B01J 20/0285; C01B 3/56; C01B 2203/0465; C01B 2203/042; C10G 25/003; C10G 45/22
See application file for complete search history.

(56) References Cited

U.S. PATENT DOCUMENTS

| | | |
|---|---|---|
| 4,094,777 A | 6/1978 | Sugier et al. |
| 5,245,106 A | 9/1993 | Cameron et al. |
| 2008/0184884 A1* | 8/2008 | Jadhav .................. B01D 53/02 95/134 |
| 2011/0226700 A1 | 9/2011 | Hetherington et al. |

FOREIGN PATENT DOCUMENTS

| | | | |
|---|---|---|---|
| CN | 1062301 | 7/1992 | |
| GB | 2 428 598 A | 2/2007 | |
| WO | 2009/101429 A1 | 8/2009 | |
| WO | WO 2009101429 A1 * | 8/2009 | .............. B01J 20/02 |
| WO | WO 2010061212 A1 * | 6/2010 | ............. B01D 15/00 |
| WO | 2011/021024 A1 | 2/2011 | |
| WO | 2011/081836 A2 | 7/2011 | |

OTHER PUBLICATIONS

International Search Report, dated Oct. 30, 2013, from corresponding PCT application.
GB Search Report, dated Nov. 14, 2012, from corresponding GB Application.

* cited by examiner

*Primary Examiner* — Anthony J Zimmer
*Assistant Examiner* — Syed T Iqbal
(74) *Attorney, Agent, or Firm* — Baker & Hostetler LLP

(57) ABSTRACT

A process for removing heavy metals from process fluids includes passing a heavy-metal-containing process fluid, including a reductant selected from hydrogen and carbon monoxide, at an inlet temperature $\leq 125°$ C. over a sorbent including
(i) 4-75% by weight of one or more sulphided copper compounds selected from sulphided basic copper carbonate, sulphided copper hydroxide, sulphided copper oxide or mixtures of these,
(ii) optionally a support material, and
(iii) a binder and the binder content of the sorbent is in the range 5-30% by weight,
wherein essentially all of the sulphided copper is in the form of CuS and the total metal sulphide content of the sorbent, other than copper sulphide, is $\leq 5\%$ wt.

20 Claims, No Drawings

PROCESS FOR REMOVING HEAVY METALS FROM PROCESS STREAMS

BACKGROUND OF THE INVENTION

Field of the Invention

This invention relates to a process for removing heavy metals from process streams comprising a reductant, particularly process streams comprising hydrogen.

Description of the Related Art

Heavy metals such as mercury are found in small quantities in fluid streams such as hydrocarbon or other gas and liquid streams. Arsenic and antimony may also be found in small quantities in hydrocarbon streams. Mercury, in addition to its toxicity, can cause failure of aluminium heat exchangers and other processing equipment. Therefore there is a need to efficiently remove these metals from fluid streams, preferably as early as possible in the process flowsheet.

Sorbents comprising CuS are known to be effective for capturing mercury by the following reaction:

2 CuS+Hg→HgS+Cu2S

Process streams containing a reductant or reducing compound such as hydrogen and/or carbon monoxide may contain heavy metals but treatment with sulphided copper compounds comprising CuS risks the exothermic reduction of copper to elemental form and the release of hydrogen sulphide or carbonyl sulphide into the process fluid, both of which are undesirable. The exothermic reaction may lead to unwanted side reactions while the release of sulphide may have negative consequences in downstream processing.

US2008/184884 discloses a method for removal of mercury from a gaseous stream containing the mercury, hydrogen and/or CO, and hydrogen sulfide and/or carbonyl sulfide in which a dispersed Cu-containing sorbent is contacted with the gaseous stream at a temperature in the range of about 25 DEG C. to about 300 DEG C.

SUMMARY OF THE INVENTION

We have found that sorbents in which essentially all of the sulphided copper is in the form of CuS may be used in process streams containing a reductant under certain conditions without the undesirable reduction exotherm and release of sulphide.

Accordingly, the invention provides a process for removing heavy metals from process fluids comprising passing a heavy-metal-containing process fluid, comprising a reductant selected from hydrogen and carbon monoxide, at an inlet temperature ≤125° C. over a sorbent comprising:
(i) 4-75% by weight of one or more sulphided copper compounds selected from sulphided basic copper carbonate, sulphided copper hydroxide, sulphided copper oxide or mixtures of these,
(ii) optionally, a support material, and
(iii) a binder and the binder content of the sorbent is in the range 5-30% by weight, wherein essentially all of the sulphided copper is in the form of CuS and the total metal sulphide content of the sorbent, other than copper sulphide, is ≤5% wt.

DETAILED DESCRIPTION OF THE INVENTION

By "sorbent" we include absorbent and adsorbent.
By "heavy metal" we include mercury, arsenic selenium, cadmium and antimony.

The sorbent comprises 4-75% by weight, preferably 5-50% by weight, of a sulphided copper compound. The sorbent preferably comprises copper in an amount 5-45% wt (expressed as the oxide, CuO), preferably 5-30% wt Cu in the sulphided composition. Preferably >90% wt of the copper present in the sorbent is sulphided, more preferably >95% wt. Essentially all of the sulphided copper is in the form of CuS, The copper compound suitable for use in the sorbent is one that may be readily sulphided such as copper oxide, copper hydroxide and/or basic copper carbonate. One or more sulphidable copper compounds may be present. In one embodiment, the copper compounds comprise basic copper carbonate and copper oxide.

The sorbents comprise a support and/or binder in addition to the copper sulphide.

In one embodiment, the sorbent comprises one or more powdered copper-containing materials that have been shaped with the aid of a binder, and sulphided. The shaped sorbent thereby comprises copper sulphide and a binder. Where the copper compounds are particulate they are desirably in the form of powders with an average particle size, i.e. $D_{50}$, in the range 10-100 μm. Binders that may be used to prepare the shaped sorbent include clays such as bentonite, sepiolite, minugel and Attapulgite clays, cements, particularly calcium aluminate cements such as ciment fondu, and organic polymer binders such as cellulose binders, or a mixture thereof. Particularly strong shaped units may be formed where the binder is a combination of a cement binder, such as a calcium aluminate, and an aluminosilicate clay binder having an aspect ratio >2, such as an Attapulgite clay. In such materials, the relative amounts of the cement and clay binders may be in the range 1:1 to 3:1 (first to second binder). The total amount of the binder may be in the range 5-30% by weight (based upon the sulphided composition).

In a preferred embodiment, the sorbent comprises one or more powdered copper-containing materials that have been combined with a powdered support material and shaped with the aid of a binder, then dried if necessary, and sulphided. The shaped sorbent thereby consists essentially of copper sulphide, a support material and one or more binders. In a particularly preferred embodiment, the sorbent comprises 5-50% by weight of a particulate sulphided copper compound, 30-90% by weight of a particulate support material, and the remainder one or more binders, wherein the metal sulphide content of the absorbent, other than copper sulphide, is ≤5% by weight.

The support may be any inert support material suitable for use in preparing sorbents. Such support materials are known and include alumina, metal-aluminate, silica, titania, zirconia, zinc oxide, aluminosilicates, zeolites, metal carbonate, carbon, or a mixture thereof. The support material offers a means to adapt the physical properties of the sorbent to the duty. Thus the surface area, porosity and crush strength of the sorbent may suitably be tailored to its use. Furthermore, the presence of support particles can increase the strength and durability of the sorbent composition by acting as a diluent. The sorbent composition is then better able to retain its physical integrity during the sulphiding process, which causes a volumetric change in the copper compound as the copper sulphide is formed. Support materials are desirably oxide materials such as aluminas, titanias, zirconias, silicas and aluminosilicates, or mixtures of two or more of these. Hydrated oxides may also be used, for example alumina trihydrate or boehmite. Particularly suitable supports are aluminas and hydrated aluminas, especially alumina trihydrate.

The sorbent materials can undergo considerable physiochemical changes upon treatment with sulphur compounds to form the active copper sulphide phase. The physiochemical change, even where support materials are included, can result in reduced crush strength and an increased susceptibility to attrition, particularly with high metal sulphide containing materials. It is therefore desirable to increase the crush strength whilst maintaining attrition resistance. We have found that a combination of binders and support material in the sorbent overcomes this problem. Furthermore, by using the two binders we have found that the amount of support material may be increased compared to prior art materials without sacrificing rate of heavy metal sorption, strength or attrition resistance.

Thus in a preferred embodiment, the sorbent composition comprises a first binder and a second binder, wherein the first binder is a cement binder and the second binder is a high aspect ratio binder having an aspect ratio >2.

The first binder is a cement binder, in particular a calcium aluminate cement. By the term calcium aluminate cement we include such calcium aluminate compounds as calcium monoaluminate ($CaO.Al_2O_3$), tricalcium aluminate ($3CaO.Al_2O_3$), pentacalcium trialuminate ($5CaO.3Al_2O_3$), tricalcium penta aluminate ($3CaO.5Al_2O_3$), dodeca calcium hepta aluminate ($12CaO.7Al_2O_3$) and high alumina cements which may contain alumina in admixture with, dissolved in, or combined with such calcium aluminate compounds. For example, a well-known commercial cement has a composition corresponding to about 18% wt calcium oxide, 79% wt alumina and 3% wt water and other oxides. Another suitable commercially available calcium aluminate cement has a composition corresponding to about 40% wt calcium oxide, about 37% wt alumina, about 6% wt silica and about 20% other oxides.

The second binder is a high aspect ratio binder having an aspect ratio >2. By the term high aspect ratio we mean that the ratio between the maximum dimension and the minimum dimension of the particles is >2. The particles may thus be plate-like where the length and breadth are at least twice the thickness. Alternatively, and preferably, the particles are acicular, wherein the average length is at least twice, preferably at least 2.5 times, the breadth, e.g. having a "rod" configuration wherein the cross sectional dimensions, i.e. breadth and thickness are approximately equal, or a "lath" configuration, wherein the thickness is significantly less than the breadth. Suitable high aspect ratio binders include clay binders such as aluminosilicate clays, preferably attapulgite clay, sepiolite clay or bentonite clay.

The amount of the first binder may be in the range 1 to 15% by weight based on the un-sulphided sorbent precursor composition. The amount of the second binder may be in the range 1 to 15%, preferably 5 to 15% by weight on the un-sulphided sorbent precursor. Preferably, the relative amounts of the binders are 1:1 to 3:1 first to second binder.

A particularly preferred sorbent composition comprises 20-40% by weight in total of one or more particulate sulphided copper compounds, a particulate hydrated alumina support material, bound together with a cement binder and a clay binder having an aspect ratio >2, wherein the zinc content of the sorbent is ≤0.1% by weight (expressed as oxide).

Other components may also be present in the sorbent to enhance the physical properties of the sorbent. Other such additives include zinc compounds such as zinc oxide, zinc carbonate or zinc hydroxycarbonate, or other transition metal compounds, which may become sulphided during manufacture. However, where high water-tolerance of the sorbent is required, the zinc sulphide content of the sorbent is preferably ≤5% by weight, more preferably ≤1% wt, most preferably ≤0.5% wt, especially ≤0.1% wt (based on the sulphided composition).

The sorbent may be in the form of pellets, extrudates or granules. The pellets, extrudates or granules preferably have a minimum dimension in the range 1 to 15 mm and a maximum dimension in the range 1 to 25 mm, with an aspect ratio (longest dimension divided by shortest dimension) ≤4. Spherical granules with a diameter in the range 1-15 mm are preferred.

The method for making the sorbent may comprise the steps of: (i) making a sorbent precursor comprising one or more of an oxide or hydroxycarbonate of copper, and optionally a support, and binder, and (ii) sulphiding the precursor with a gas mixture comprising hydrogen sulphide to form a sulphided composition. The support, sorbent precursor or sorbent itself may be shaped.

Hence, the sorbent precursor may be made simply by combining a particulate copper sulphide precursor compound selected from an oxide, hydroxide, carbonate or hydroxycarbonate of copper, with a powdered support material and one or more binders. This method may be used to prepare sorbents containing up to 75% by weight copper. The copper sulphide precursor compound may be commercially sourced or may be generated, e.g. by precipitation from a solution of metal salts using alkaline precipitants, e.g. an alkali metal carbonate and/or alkali metal hydroxide, using known methods, followed by drying and optionally calcination. Thus in one embodiment, a copper sulphide precursor compound may be made by precipitating copper-hydroxycarbonate and optionally zinc-hydroxycarbonate in the presence of a hydrous alumina support using an alkali metal carbonate and alkali metal hydroxide precipitant mixture, followed by washing and drying the precipitate.

Where the sorbent precursor is in the form of a powder it is preferably shaped, and if need be dried, prior to sulphidation. Alternatively the material may be shaped after sulphidation. Where the support materials are in the form of powders, they preferably have a particle size of <100 μm, more preferably 5-65 μm. Sorbent tablets may be formed by moulding a powder composition, generally containing a material such as graphite or magnesium stearate as a moulding aid, in suitably sized moulds, e.g. as in conventional tableting operation. Alternatively, the sorbent may be in the form of extruded pellets formed by forcing a suitable composition and often a little water and/or a moulding aid as indicated above, through a die followed by cutting the material emerging from the die into short lengths. For example extruded pellets may be made using a pellet mill of the type used for pelleting animal feedstuffs, wherein the mixture to be pelleted is charged to a rotating perforate cylinder through the perforations of which the mixture is forced by a bar or roller within the cylinder: the resulting extruded mixture is cut from the surface of the rotating cylinder by a doctor knife positioned to give extruded pellets of the desired length.

Alternatively, the sorbent may be in the form of agglomerates formed by mixing a powder composition with a little water, insufficient to form a slurry, and then causing the composition to agglomerate into roughly spherical, but generally irregular, granules in a granulator. The different shaping methods have an effect on the surface area, porosity and pore structure within the shaped articles and in turn this often has a significant effect on the sorption characteristics and on the bulk density.

Thus beds of sorbents in the form of moulded tablets may exhibit a relatively broad absorption front, whereas beds of agglomerates can have a much sharper absorption front: this enables a closer approach to be made to the theoretical absorption capacity. On the other hand, agglomerates generally have lower bulk densities than tableted compositions. It is preferred to make the shaped units in the form of agglomerates and thus a preferred preparation method involves forming spherical sorbent precursor agglomerates comprising particles of the copper sulphide precursor compound, one or more binders and optionally a support material in a granulator.

Where the sorbent precursor is shaped using a solvent, such as water, the shaped precursor units are preferably dried before sulphiding. Drying temperatures up to 120° C. may be used.

The sulphiding agent used to sulphide the sorbent precursor may be one or more sulphur compounds such as hydrogen sulphide, carbonyl sulphide, mercaptans and polysulphides, or mixtures of these. Hydrogen sulphide is preferred. Using a hydrogen sulphide-containing gas mixture is considerably easier and faster than using alternatives such as solutions of sulphur or sulphur compounds such as polysulphides. The gas mixture may, if desired, contain other sulphur compounds such as carbonyl sulphide or volatile mercaptans. Inert gases such as nitrogen, helium or argon may also be present. Hydrogen sulphide is preferably provided to the precursor in gas streams at concentrations of 0.1 to 5% by volume. Sulphiding temperatures in the range 1-100° C., preferably 5-50° C. may be used.

The sulphiding step may be performed on the dried sorbent precursor ex-situ in a sulphiding vessel through which a sulphiding agent is passed, or the sulphiding step may be performed in situ, in which case a sorbent precursor is installed and undergoes sulphidation in the vessel in which it is used to absorb mercury compounds. In-situ sulphiding may be achieved using a sulphiding agent stream or where the stream containing mercury also contains sulphur compounds, the mercury-containing stream. Where such concomitant sulphiding and mercury absorption occurs, the amount of sulphur compound that is present depends on the type of sulphur compound and metal compound used. Usually, a concentration ratio, as defined by the ratio of sulphur compound (expressed as hydrogen sulphide) concentration (v/v) to mercury concentration (v/v), of at least one, and preferably of at least 10 is used so that the precursor is sufficiently sulphided. Should the initial concentration of the sulphur compound in the feed stream be below the level necessary to establish the desired ratio of sulphur compound to mercury compound concentration then it is preferred that the concentration of the sulphur compound is increased by any suitable method.

The sorbent is preferably pre-sulphided. Pre-sulphiding avoids problems caused by the change in volume and strength of the sorbent that can accompany the sulphiding step.

Sulphiding produces a sulphided sorbent precursor in which essentially all of the Cu is divalent and so has a S:Cu atomic ratio of 1:1. In order to provide process-efficient materials that allow for suitable absorption vessel sizes, it is preferred that the density of the absorbent, expressed as the sulphur density, is in the range 50 to 200 kg S/m$^3$.

The process for the removal of heavy metals, particularly mercury, arsenic selenium and cadmium from process fluids may be carried out simply by contacting the fluid with the copper sulphide sorbent in a suitable vessel.

The present invention may be used to treat both liquid and gaseous fluids containing one or more reductants such as hydrogen and/or carbon monoxide, notably hydrogen. In one embodiment, the fluid is a liquid hydrocarbon stream containing dissolved hydrogen and/or carbon monoxide. In another embodiment, the fluid is a gaseous stream containing hydrogen and/or carbon monoxide, i.e. a reducing gas stream. The concentration of reductant in the gaseous process fluid may be in the range 1-100% by volume, preferably 5-95%, more preferably either 1-49% vol or 50-95% vol.

The process fluid inlet temperature should be ≤125° C., preferably ≤100° C., particularly ≤95° C. By "inlet temperature", we mean the temperature of the process fluid fed to the sorbent.

In gaseous process fluids, at high reductant concentrations in the range 50-95% by volume, the inlet temperature is preferably in the range 10-75° C. At lower reductant concentrations in the range 2-49% by volume the inlet temperature is preferably in the range 20-125° C. but may be in the range 80-100° C.

The mercury may be in the form of elemental mercury, or organomercuric, or organomercurous compounds. The present invention is particularly effective in removing elemental mercury although other forms of mercury may be removed for short periods. Typically the concentration of mercury in a gaseous feed stream is from 0.01 to 1100 μg/Nm$^3$, and more usually between 10 to 600 μg/Nm$^3$.

Gas streams that may benefit from this process include synthesis gas streams from conventional steam reforming processes and/or partial oxidation processes, and synthesis gas streams from a coal gasifier, e.g. as part of a IGCC process, after gas washing and heat recovery (cooling) steps, and before the sour shift stage.

Other streams that may benefit from the present invention include refinery vent streams, refinery cracker streams, blast furnace gases, reducing gases, particularly hydrogen-rich gas streams, ethylene-rich streams and liquid or gaseous hydrocarbon streams, e.g. naphtha, fed or recovered from hydrotreating processes, such as hydrodesulphurisation or hydrodenitrification.

In use, the shaped units of sorbent material may be placed in a sorption vessel in the form of a fixed bed and the process fluid stream containing heavy metal is passed through it. It is possible to apply the sorbent in the vessel as one or more fixed beds according to known methods. More than one bed may be employed and the beds may be the same or different in composition. The gas hourly space velocity through the sorbent may be in the range normally employed.

The present invention is of particular utility where the process fluid contains water, preferably in low levels in the range 0.02 to 1% vol. Higher levels up to 5% vol may be tolerated for short periods. The sorbents of the present invention may be regenerated simply after prolonged exposure to water simply by purging with a dry gas, preferably a dry inert gas such as nitrogen.

The invention is further described by reference to the following Examples.

Example 1: Gas Phase Testing

A sorbent was prepared using a granulation technique wherein basic copper carbonate (35 parts by weight), alumina trihydrate (51 parts by weight), calcium aluminate (14 parts by weight) and attapulgite clay (14 parts by weight) were combined with a little water and mixed to form granules in a Hobart mixer. The recovered granulated material was dried and then sulphided to a fully sulphided state using 1% $H_2S$ in $N_2$ at ambient temperature and pressure.

The sulphided copper sorbent (25 ml, 2.00-2.80 mm size fraction) was charged to a stainless steel reactor (21 mm ID). A flow of 80% hydrogen/20% nitrogen v/v was passed through a bubbler containing elemental mercury to allow the gas to pick up the mercury. The mercury-laden gas was then passed in a down-flow arrangement through the reactor under the following conditions.

| | |
|---|---|
| Pressure: | 5 barg |
| Inlet Temperature | 50° C. |
| Gas flow | 53 NL · hr$^{-1}$ |
| Contact time | 8.5 seconds |
| Test duration | 747 hours |

No reduction exotherm was observed, despite the high reductant concentration. Samples from the reactor inlet and exit were periodically analysed for mercury content by atomic fluorescence spectroscopy. The inlet gas was saturated at 25° C. giving a mercury concentration at the inlet of about 1,250 µg/m$^3$. The sorbent reduced the mercury content of the exit gas to below detectable limits.

Subsequent analysis of the recovered sorbent showed that no mercury was present in the lower 50% of the bed.

The invention claimed is:

1. A process for removing heavy metals from process fluids, comprising passing a heavy-metal-containing process fluid comprising a reductant that is hydrogen or carbon monoxide at an inlet temperature of 125° C. or less over a sorbent having a form of extrudates or granules, wherein the sorbent comprises:
   (i) 5-50% by weight of sulfided basic copper carbonate powder,
   (ii) a powdered support material, and
   (iii) 5-30% by weight of a binder,
   wherein essentially all of the sulfided copper is in the form of CuS and the total metal sulfide content of the sorbent, other than copper sulfide, is 5% wt or less.

2. The process according to claim 1, wherein the sorbent comprises a support material that is alumina, hydrated alumina, titania, zirconia, silica or aluminosilicate, or a mixture of two or more of these.

3. The process according to claim 1, wherein the sorbent comprises a first binder and a second binder, wherein the first binder is a cement binder and the second binder is a high aspect ratio binder having an aspect ratio of greater than 2.

4. The process according to claim 3, wherein the first binder is a calcium aluminate cement binder.

5. The process according to claim 3, wherein the second binder is an aluminosilicate clay.

6. The process according to claim 3, wherein the relative amounts of the first and second binder are in the range of 1:1 to 3:1.

7. The process according to claim 1, wherein the total metal sulfide content of the sorbent, other than copper sulfide, is 0.5% wt or less.

8. The process according to claim 1, wherein the sulfur density of the sorbent is in the range of 50 to 200 kg S/m$^3$.

9. The process according to claim 1, wherein the process fluid is a liquid hydrocarbon stream containing dissolved hydrogen and/or carbon monoxide.

10. The process according to claim 1, wherein the process fluid is a gaseous stream containing hydrogen and/or carbon monoxide.

11. The process according to claim 10, wherein the gaseous stream comprises a reductant in the range of 1-100 vol %.

12. The process according to claim 10, wherein the process fluid is a synthesis gas stream.

13. The process according to claim 10, wherein the process fluid is a refinery vent stream, a refinery cracker stream, a blast furnace gas, a reducing gas, or a hydrogen-rich gas stream.

14. The process according to claim 1, wherein the process fluid inlet temperature is 100° C. or less.

15. The process according to claim 1, wherein the process fluid further comprises water in the range of 0.02 to 1 vol %.

16. The process according to claim 10, wherein the gaseous stream comprises a reductant in the range of 5-95 vol %.

17. The process according to claim 10, wherein the gaseous stream comprises a reductant in the range of 1-49 vol %.

18. The process according to claim 10, wherein the gaseous stream comprises a reductant in the range of 50-95 vol %.

19. The process according to claim 1, wherein the process fluid inlet temperature is 95° C. or less.

20. The process according to claim 1, wherein the sulfided basic copper carbonate powder has an average particle size $D_{50}$ in a range of 10-100 µm, and the powdered support material has a particle size of 5-65 µm.

* * * * *